Jan. 2, 1968  G. F. RIGONDAUD  3,361,516
TRACING IMPLEMENTS
Filed Oct. 23, 1965  3 Sheets-Sheet 1
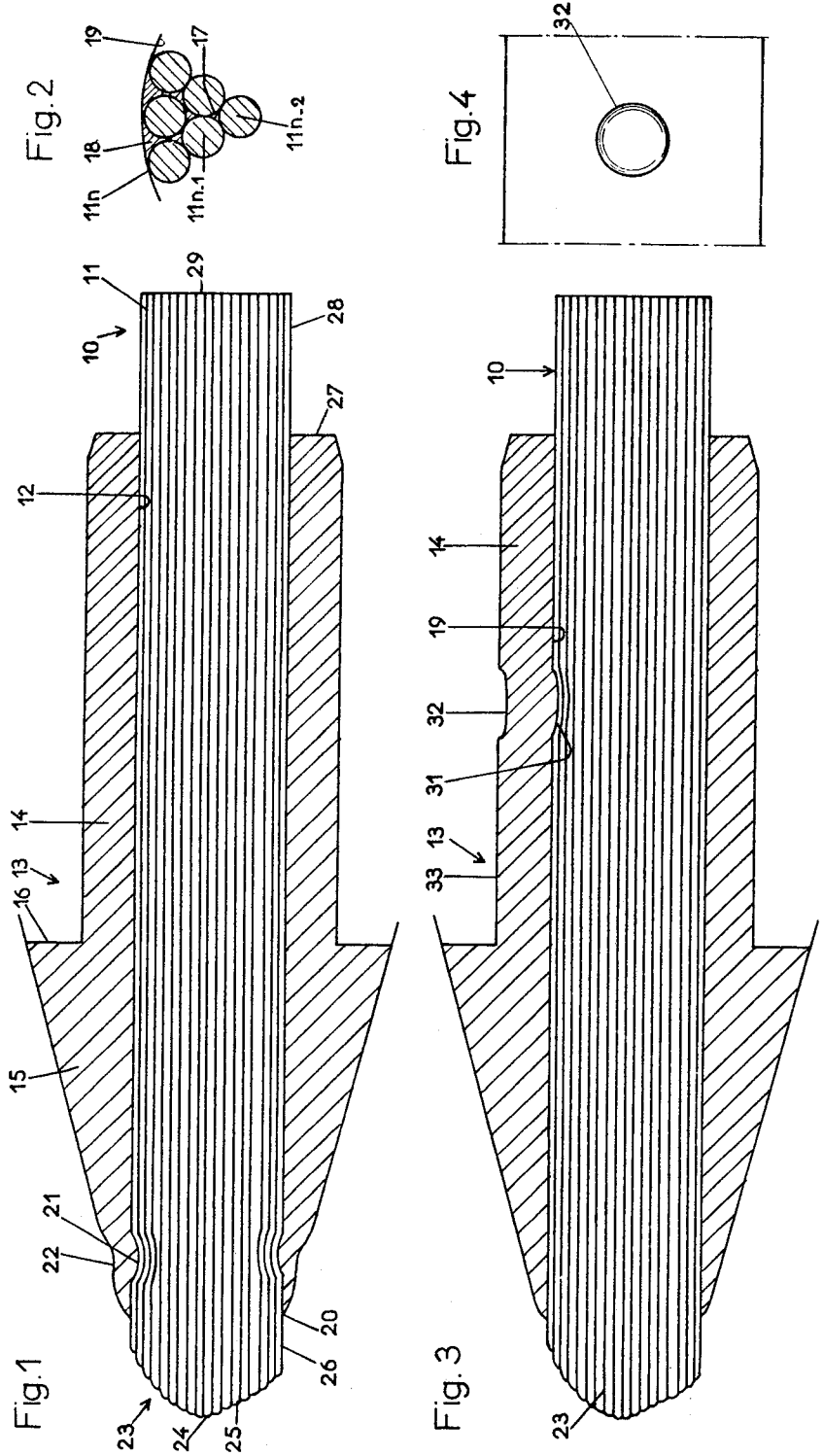

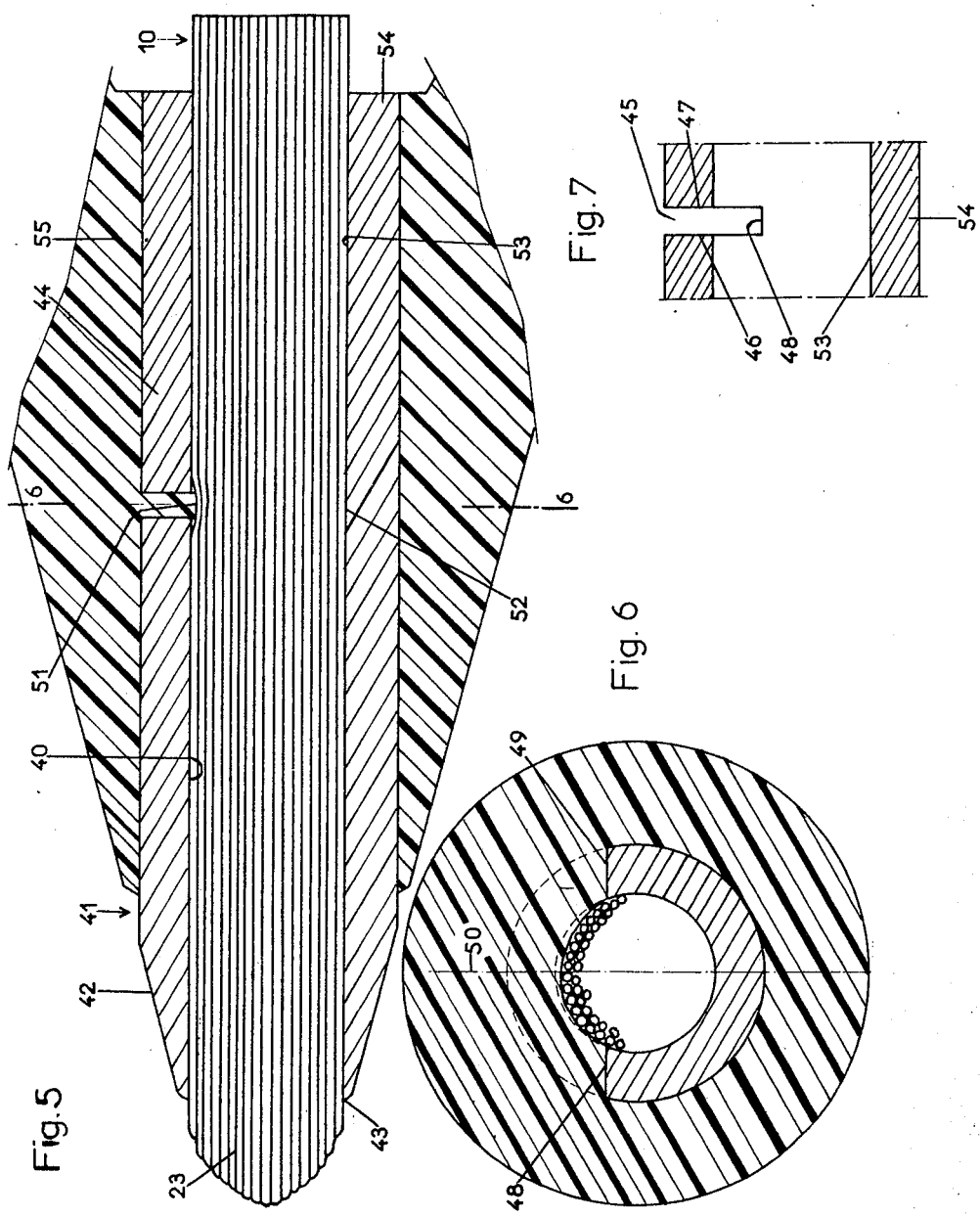

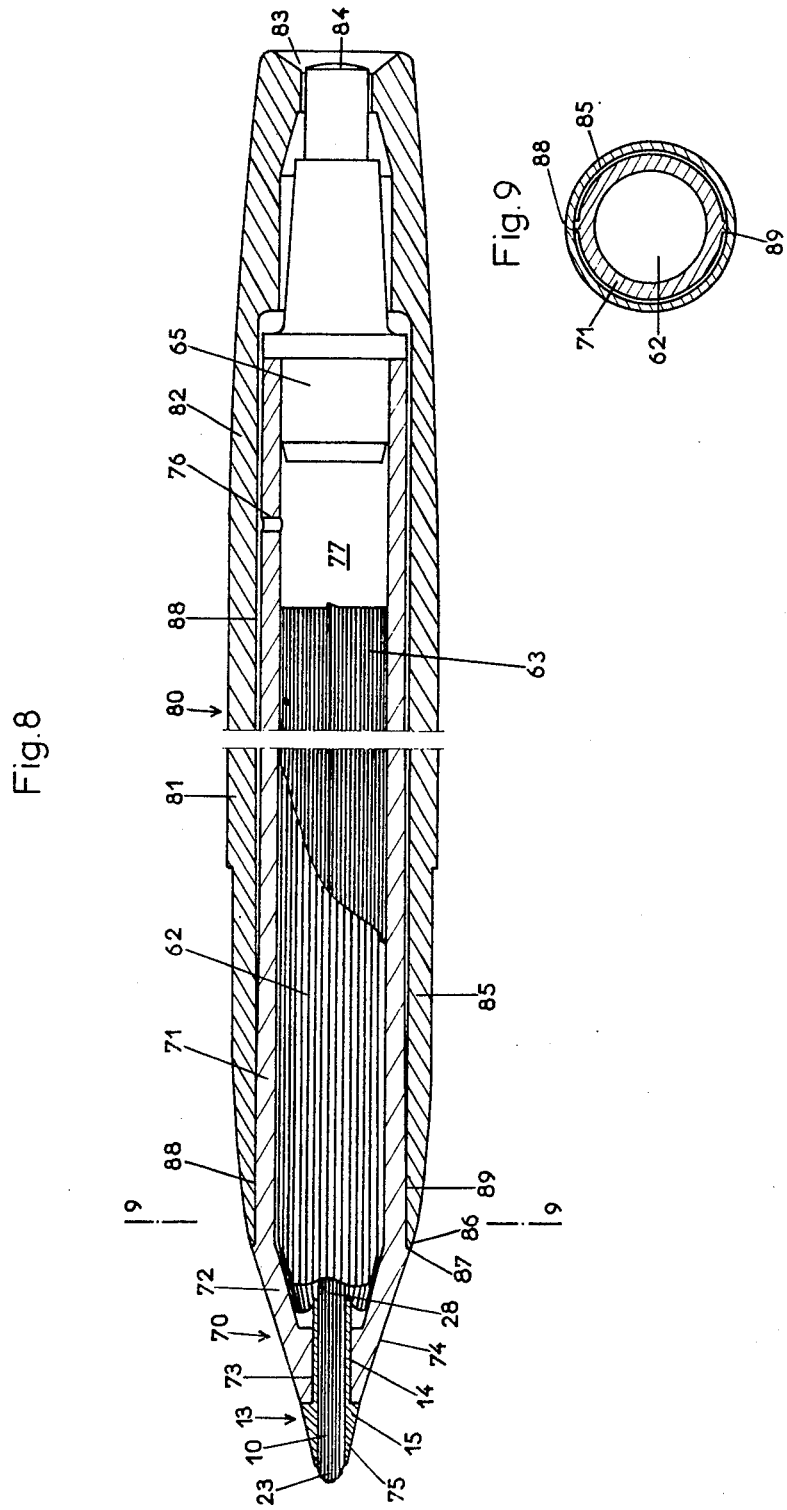

United States Patent Office 3,361,516
Patented Jan. 2, 1968

3,361,516
TRACING IMPLEMENTS
Guy Frédéric Rigondaud, Paris, France, assignor to Societe E. Le Foyer & Cie, Paris, France, a French company
Filed Oct. 23, 1965, Ser. No. 503,950
Claims priority, application France, July 28, 1965, 26,343
1 Claim. (Cl. 401—292)

The invention relates to a tracing implement.

The invention contemplates a tracing implement in which the tracing is not carried out by a pen, as with stylographs, or by a ball-point as with ball-point stylos, but by an elongated tracing member that is more or less flexible and has one end projecting beyond the implement, the other end being in communication with a reservoir of tracing fluid, such as ink.

Tracing implements of this type have in recent times become common, and their tracing member is usually constituted of wires or portions of wires or fibres assembled together in such a way as to maintain the shape required at the tip for effecting good tracing.

Occasionally use is made for this purpose of a felt tracing member, the concept being that the intermingling of the fibres, which is a characteristic of felt, will ensure that the said member has adequate statility of shape. A tracing implement with a felt point is, however, only suitable for producing coarse lines that are furthermore of somewhat irregular width.

For some time now tracing implements have been proposed wherein the tracing member is constituted of an assembly of acrylic wires or other similar synthetic fibres substantially equal in length to the tracing member, and held together by an agglomerant. The said wires or fibres are usually very thin, being of the order of 1 to 3 denier. Such tracing implements have wide distribution, but have a restricted sphere of application, and present certain disadvantages.

In particular their length of life is limited, by reason of the plastic deformation of the bundle of very fine wires constituting the tracing member and which takes place under repeated tracing pressures, this deformation, since the agglomerated bundle has no inherent elasticity, being promoted and/or intensified by the response to increase in temperature of the agglomerant or binder used to assemble the wires together to form a bundle.

Furthermore with an implement of this type, the flow of ink is not constant when writing takes place, particularly when the feed reservoir of the implement is of the capillary type, by reason of the fact that the difference between the dimensions of the capillary spaces of the reserve means and those of the tip constituted by the agglomeration of fine fibres is too slight.

Again, the point becomes coarser after usage or deformation, and this makes itself felt rapidly, with the result that conditions of flow of the liquid are changed, and functioning becomes defective.

It has been found that in actual practice it was not possible to obtain a tracing of uniform strength with such implements, in particular when the ink reserve is running low. Furthermore, the tracing is not clearly defined. As soon as a portion of the ink reserve has been used up, the said point produces often a double line, which is undesirable.

With implements of this type it is difficult furthermore to start the tracing operation if the tip has been left in the open air for any considerable time, which frequently occurs.

It is an object of the invention to provide a tracing implement which ensures a tracing that is an improvement on that obtained with known implements.

It is a particular object of the invention to provide a tracing implement that gives a tracing of uniform intensity, even when of great length, until the ink reserve has been fully used up.

It is a further object of the invention to provide a tracing implement which ensures a tracing of uniform thickness, corresponding to the size of the tip selected and for as long as there is ink in the reservoir.

It is also an object of the invention to provide a tracing element which produces a tracing immediately as the point is applied to the writing surface, even if said tip has been left in the open air for a long time.

It has been found, surprisingly, that a tracing member or point can be produced making it possible to obtain an implement having properties superior to those of the implements known up to the present, by using wires that are not agglomerated together but simply juxtaposed parallel to each other to form a bundle forming free longitudinal capillary channels between the wires.

The invention provides that the wire forming the tracing member has a diameter that is considerably greater than that of the wires of the current tracing members, in a ratio that may be 30:1.

The invention contemplates the use of wires or fibres of synthetic or natural material, having high flexibility and good resistance to wear by friction, an example of such material being a polyamide or super-polyamide, such as nylon.

The invention also provides for the use of acrylic wires or fibres, cellulose acetate wires or fibres, and metallic wires, or strands of animal or vegetable origin.

Contrary to what might have been expected, the tip of such a tracing member, wherein the wires are not connected by an agglomerant, and form a slight projection in relation to the body of the device, has a shape-retention superior to that of known tracing members and the performances of the implement are remarkable, while its manufacture is simpler and more economical. In actual fact, the implement of the invention is a writing and tracing implement that is superior to the known tracing implements in its possible spheres of application.

The invention furthermore provides various embodiments, characterized mainly by the means provided for holding the writing member and likewise by the general arrangement of the implement in the body or tip of the implement.

The invention will now be described with reference to the accompanying drawings, which show embodiments of the invention but in no restrictive sense.

FIGURE 1 is a view in longitudinal section of a tracing device of the invention.

FIGURE 2 is a view partly in transverse section on a larger scale.

FIGURE 3 is a view similar to FIGURE 1, but for another embodiment.

FIGURE 4 is a front view of a part of the device of the invention.

FIGURE 5 is a view similar to FIGURES 1 and 3, but again for another embodiment.

FIGURE 6 is a view in section along the line 6—6 of FIGURE 5.

FIGURE 7 is a view in section of a part of the body of the device before the introduction of the wires.

FIGURE 8 is a view in longitudinal section of a tracing implement of the invention, showing one embodiment.

FIGURE 9 is a view in section along 9—9 of FIGURE 8 but without showing the material with capillary structure.

Referring to FIGURE 1, the tracing member is constituted of a bundle 10 of wires 11 which are housed in the cylindrical channel 12 of a holding member 13 which can be metallic, or of plastic or some other material, adapted to form the forward end of the implement. The holding member in the embodiment described comprises an annular cylindrical body 14 and a frusto-conical point 15 with a shoulder 16 adapted to cooperate with the body proper of the implement.

The axes of the wires 11 are arranged parallel to each other the wires are formed of a flexible resilient material, i.e., a material which springs back to its original shape after having been subject to bending stress, and which keeps this quality even after having been subjected to a considerable number of flexings; the material selected also has high resistance to wear by friction. An example of such material is provided by a polyamide or super-polyamide, i.e., nylon. The wires can also be constituted of acrylic material, or cellulose acetate; they can furthermore be metallic or constituted of strands of animal or vegetable origin. The said wires have a diameter between 0.1 and 0.3 mm., but these numerical indications are not to be taken in any restrictive sense, though they do show that the wires used in the implement of the invention are of an order of size different from that used in current tracing implements, which are often wires of 1 to 3 denier.

FIGURE 2 shows on a larger scale in cross-section a certain number of wires of the bundle, the wires $11_n$ of the external layer being in contact with the wires $11_{n-1}$ of the immediately adjacent layer, a wire $11_{n-2}$ of the adjacent layer also being shown. Communication between the writing tip and the ink reserve is obtained by the capillary interstices between the wires, a certain number of the said interstices having a curvilinear triangular shape in cross-section, as shown at 17, certain others, for example those shown at 18, and for which a boundary is constituted by the internal surface 19 of the conduit 12, having an elongated diabolo shape.

To construct the tracing member of the invention, the bundle 10 is first formed by placing wires 11 on top of each other the wires 11 not being glued or prepared or covered with binder, and having been previously cut into lengths. Thereupon the bundle 10 is put into the conduit 12, the diameter of which is such that the bundle 10 of strands fills it completely. The forward end of the bundle 10 is caused to project in relation to the forward edge 20 of the cone 15 by a relatively slight amount, of the order of 1 to 2 mm., the said projecting length being a function of the diameter of the bundle 10. The strands are thus firmly held against each other to form a bundle of parallel strands over the whole of their length with the exception of the part projecting in relation to the conduit.

Accordingly for the whole of its length in the interior of the conduit the bundle has complete rigidity and its strands are perfectly parallel to each other. It accordingly functions not as a paint brush but in the nature of a plurality of drawing pens. No matter at what angle of inclination the tip is applied, or whatever its orientation on the writting surface it is always in a suitable position, with each group of strands, over the whole periphery of the tip playing the same role as the adjacent groups. The steadiness and regularity of the tracing formed are to be explained by the fact that all the strands comprising the bundle are exactly equal to each other in diameter, and accordingly the longitudinal capillary channels formed between each of them are also perfectly identical, thus ensuring a perfectly regular flow of ink.

The longitudinal capillary interstices formed by the wires have varying dimensions in accordance with the size of the wires or the fibres used. The larger the fibres, the larger the capillary spaces between wires will be, and the greater the ink flow. One can accordingly regulate the intensity of the tracing for a line of the same width. In the case where the ink is stored in a material with a capillary structure, it is of course necessary to take into account the relation to be observed between the dimensions of the spaces of the capillary reservoir and those of the capillary channels of the bundle.

The dimension of the capillary channels of the bundle of a tracing member of the invention make it possible to use inks containing coloring matter which up to the present could not be used in the manufacture of liquid inks for stylographs, by reason of their viscosity and the surface tension value which they imparted to the ink.

With the tracing device of the invention it is also possible to use inks that are very highly charged with coloring matter, which accordingly provide a very intense tracing without the rate of flow of the ink being excessively diminished thereby.

In order to make a fine tip, a wire or fine fibre is selected, and the conduit is of small diameter (i.e., of the order of 0.5 to 0.9 mm.). To make a coarse tip with which it would be possible to draw a thicker line, a coarser fibre is selected and a conduit of larger diameter (i.e., of the order of 1.5 mm. and above). Even in the case of a fine tip, however, the fibre or the wire selected is considerably coarser than the fibre constituting the agglomerated tips at present known.

It can be indicated for example that for a conduit of diameter 1.5 mm., it is possible, with a bundle constituted of thirty-five strands of 0.2 mm., to obtain a tracing comparable to that with a stylograph pen known generally as a "medium pen." For a diameter of conduit 12 of 0.9 mm., it is possible, with a bundle constituted of thirteen strands of 0.2 mm., or twenty or twenty-five strands of 0.15 mm., to obtain a tracing comparable to that of a stylograph pen known generally as "fine pen."

Adequate solidarity is obtained as far as the cone 15 and the bundle are concerned by subjecting the cone to a seating operation, which brings about on the internal surface 19 of the conduit 12 a circular doming 21, the external restriction throat being shown at 22. The said restricting is preferably produced at a short distance from the forward end of the cone 15 terminating the bundle-holder, for example at a minimum one millimeter from the said end so as to allow adequate mobility of the strands in relation to each other.

The end 23 of the bundle is given an oblong shape, approximating a paraboloid, so as to provide an apex 24 connected by a rounded surface 25 to the substantially cylindrical external surface 26. It has been found that a shaping of this type can be obtained very easily by simply milling the end of the bundle of wires, by rotating the carrier-member of the bundle of wires about its axis when the end of the bundle is in contact with a rotating mill.

The tracing device constituted in this way can be fed through its end opposite the tip by means of an ink reservoir, wherein the ink can be at a free level or may be contained in a material of capillary structure.

In the latter case, the bundle 10 is put in contact with the capillary material of the ink reservoir by its part projecting in relation to the rear face 27 of the body 14, either by its rear lateral surface 28 or its frontal surface 29, or preferably by both said surfaces. Under the effect of capillary forces the ink circulates between the ink reservoir and the end 23 of the bundle in the interstices formed between the wires 11. The tracing is obtained by displacement of the end 23 on the writing surface.

It has been found that with the tracing implement of the invention, the flow of ink takes place in a strictly uniform manner, and that in particular, even for an extensive tracing, the intensity of the tracing remains constant. The tracing is as good at the end as at the beginning, which is probably attributable to the fact that in the course of the tracing the flexing of the projecting parts of the wires, under the effect of the lateral abutment of the end of the bundle of wires on the writing surface, does not substantially modify the sections of the capillary interstices between the wires, and when the abutment ceases, the wires take up again their initial rectilinear position, the absence of any binding between the wires preventing irregularities which can occur by reason of the alteration and/or the elimination of such binding means.

It has been found likewise that the tracing can be started immediately, even if the writing tip has been left in the open air for a long time. This is no doubt a result of the fact that the solid particles which have been able to form by evaporation when the end of the implement is left in the open air, are immediately broken up, fragmented and eliminated by reason of the relative sliding movements which, though they may be very slight indeed, nevertheless exist, and which occur on lateral or oblique abutment against the writing surface of the end of the bundle, the projecting parts of the wires of which assume curvatures that differ slightly from each other.

Experience has shown that the tracing implement of the invention keeps its qualities for a very long time, in particular that repeated tracings do not alter the characteristics of the projecting parts of the wires, and consequently the conditions for the flow of ink remain the same. This appears to be due to the fact that the wires are positioned positively in relation to each other so that the bundle is completely homogenous, being constituted of one and the same material, and no disturbing variation, either chemical or physico-chemical, is encountered.

Referring now to FIGURE 3, it can be seen that in the embodiment shown, the assembly of the bundle 10 with the device 13 for carrying the bundle is obtained not as before by peripheral restriction as in the embodiment of FIGURE 1, but by more localized restriction, quasi-punctiform, the said restricting being carried out on the body 14 of the carrier device for carrying the bundle. The bulge 31 of the internal surface 19 of the bundle carriers ensures adequate holding of the bundle. The impression 32 on the external surface 33 of the body 14 is substantially circular, as can be seen in FIGURE 4.

In FIGURES 5 to 7 an embodiment is shown wherein the bundle of wires is inserted into the interior of the cylindrical conduit 40 of a bundle carrier 41 which terminates in the front by a frusto-conical surface 42 with a rounded part 43. The tubular cylindrical wall has a passageway such as a groove 45, which is restricted by parallel faces 46 and 47 and which covers a little less than a half circumference, the bases 48 and 49 of the groove being aligned and placed symmetrically in relation to the diametral plane 50 to which they are perpendicular.

The invention accordingly proposes to constitute the body of the implement by a moulding-on operation onto the bundle carrier 41, the material being driven back by an injection press at a pressure such that it exerts on the part 51 of the external surface of the bundle, uncovered by the groove 45, a force sufficient for there to be produced after cooling, in cooperation with the facing part 52 of the internal surface 53 of the walling 54 of the bundle carrier, a tightening that is adequate for ensuring the assembly of the bundle with the bundle carrier but whereby it is nevertheless impossible for the material to infiltrate between the fibers or soften them. The moulded material is furthermore selected to have a softening point lower than that of the fibres or wires and to leave the wires of the bundle unaltered. It has been found that a bundle fixed in this way keeps all its capillarity between the wires and also its permeability for the conduction of the ink from the reservoir to the writing surface. Polyethylene is perfectly suitable as a moulded material for use in this connection and one obtains thereby in one and the same process the body 55, which can have any desired shape as a function of the reservoir which is to receive it and to which it is to be attached, and the solidarity of the bundle with the said bundle carrier.

With reference to the embodiment shown in FIGURES 8 and 9, the member 13 carries the bundle 10, so that the rear end 28 thereof projects in relation to the tube 14. The member 13 is mounted in the forward end of the capsule 70 having a cylindrical part 71 and a frusto-conical part 72 receiving the tube 14 through a front orifice 73 therein. The external surface 74 of which extends to the external surface 75 of the cone 15. The body 71 contains a material 62 of capillary structure for retaining ink, and can be constituted of a coil of gauze in particular to gauze of multi-strand fibres of polyvinyl chloride, or a coil of crepe paper. The material can also be cellulose wadding contained within a paper tube 63, or it can be felt or a small rod of acrylic fibres or other fibres. A vent 76 is provided in the rear part of the tube 71 facing a rear compartment 77 devoid of capillary material 62. A stopper 65 obturates the rear end of the tube 71 and its color displays that of the ink contained in the capillary material 62. The said unit constitutes a tracing capsule which is preferably used in an implement body 80 of tubular shape and having a medial cylindrical part 81 and a rear part 82 which narrows slightly to the rear and opens at its rear end to form an orifice 83 through which the front face 84 of the stopper 65 is visible, the said front face indicating, by its color, the color of the ink with which the capsule 70 is charged. The front part 85 of the tube 80 forms a very slight shoulder with the mid-part 81 for the abutment of the cap, are part 85 narrows to the lower end 86 where it co-operates with a shoulder 87 provided at the connection between the conical part 72 and the cylindrical part 71 of the capsule 70. The introduction of the part 71 in the internal bore 88 of body 80 takes place with slight friction by the presence of one or two longitudinal bosses 88 and 89 on the external surface of the cylindrical part 71 of the capsule, disposed in zones diametrally opposite each other. The assembling and dismantling of a capsule from the body 80 is effected in a vary simple way by the pressing in or extraction of the capsule in relation to the body, which makes it possible to replace a used capsule by a new one or to replace a capsule containing ink of a certain color by a capsule containing ink of another color, if a writing or tracing requiring several colors is to be prepared, using the same implement body.

I claim:

1. In a tracing implement using a liquid ink: a tracing member comprising a plurality of contiguous wire elements arranged parallel to each other and assembled in the form of a bundle having a substantially circular cross-section, a tube surrounding the elements in contact with the outer surface of the said bundle and including internal projection means exerting sufficient pressure on the bundle to immobilize said elements with respect to a longitudinal movement relative to each other under the effect of the application of the tracing tip on a writing surface in which the tube has a traversing window surrounded by a moldable plastic material filling the window and exerting pressure on the portion of the bundle uncovered by the said window.

References Cited

UNITED STATES PATENTS

| | | | |
|---|---|---|---|
| 3,003,182 | 10/1961 | Rosenthal | 15—563 |
| 3,111,702 | 11/1963 | Berger | 15—563 |
| 3,203,025 | 8/1965 | Schreur | 15—563 |
| 3,232,805 | 2/1966 | Touey et al. | 156—180 |

FOREIGN PATENTS 413,764   7/1934   Great Britain.

ROBERT W. MICHELL, *Primary Examiner.*